US011811540B2

(12) United States Patent
Li

(10) Patent No.: US 11,811,540 B2
(45) Date of Patent: Nov. 7, 2023

(54) METHOD AND APPARATUS FOR ADJUSTING CONTENTION WINDOW SIZE, AND DATA TRANSMISSION DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 459 days.

(21) Appl. No.: 17/277,598

(22) PCT Filed: Sep. 21, 2018

(86) PCT No.: PCT/CN2018/107055
§ 371 (c)(1),
(2) Date: Mar. 18, 2021

(87) PCT Pub. No.: WO2020/056743
PCT Pub. Date: Mar. 26, 2020

(65) Prior Publication Data
US 2022/0029754 A1    Jan. 27, 2022

(51) Int. Cl.
*H04L 1/1867* (2023.01)
*H04L 1/1812* (2023.01)

(52) U.S. Cl.
CPC .......... *H04L 1/1893* (2013.01); *H04L 1/1812* (2013.01); *H04L 1/1896* (2013.01)

(58) Field of Classification Search
CPC .... H04L 1/1893; H04L 1/1812; H04L 1/1896
See application file for complete search history.

(56) References Cited

U.S. PATENT DOCUMENTS

2017/0019909 A1* 1/2017 Si ........................ H04W 72/02
2017/0086225 A1* 3/2017 Ljung .................. H04W 16/14

FOREIGN PATENT DOCUMENTS

| CN | 107852734 A | 3/2018 |
| CN | 108141311 A | 6/2018 |
| WO | WO 2017069798 A1 | 4/2017 |

OTHER PUBLICATIONS

English version of International Search Report in International Application No. PCT/CN2018/107055, dated May 27, 2019.
Huawei, HiSilicon, "Coexistence and channel access for NR unlicensed band operations", 3GPP TSG RAN WG1 Meeting #92bis, R1-1803679, Sanya, China, Apr. 16-Apr. 20, 2018, pp. 1-7.

* cited by examiner

*Primary Examiner* — Duc C Ho
(74) *Attorney, Agent, or Firm* — Finnegan, Henderson, Farabow, Garrett & Dunner, L.L.P.

(57) ABSTRACT

A method for adjusting a contention window size (CWS), applicable to a data transmission terminal, includes: receiving Hybrid Automatic Repeat reQuest (HARQ) feedback information for first data units and/or second data units from a data reception terminal within a reference duration, the HARQ feedback information including acknowledgement (ACK) information or non-acknowledgement (NACK) information, one second data unit including one or more first data units; determining target first data units or target second data units, for which the HARQ feedback information is counted as the NACK information; calculating a NACK ratio within the reference duration based on the determined target first data units and/or target second data units; and adjusting the CWS based on the NACK ratio.

20 Claims, 7 Drawing Sheets

METHOD AND APPARATUS FOR ADJUSTING CONTENTION WINDOW SIZE, AND DATA TRANSMISSION DEVICE

CROSS REFERENCE TO RELATED APPLICATIONS

This application is a national phase application based on International Application No. PCT/CN2018/107055, filed Sep. 21, 2018, the content of which is incorporated herein by reference.

TECHNICAL FIELD

The disclosure relates to the field of communication technologies, and particularly to a method and an apparatus for adjusting a contention window size, a data transmission device, and a computer-readable storage medium.

BACKGROUND

In the Long Term Evolution (LTE) unlicensed spectrum, the Listen Before Talk (LBT) channel detection is required before the unlicensed spectrum is used. When the channel is idle, the unlicensed spectrum may be accessed. In general, the LBT mechanism for transmitting data is a LBT mechanism of Category 4 (cat.4 for short). The principle of the LBT mechanism of cat.4 is as follows. First, it is checked whether the channel is idle at the first time granularity. When the channel is idle, the Contention Window Size (CWS) may be determined. Then a random number N is selected between 0-CWS. It is checked subsequently whether the channel is idle at the second time granularity. When the channel is idle, the random number N reduces by 1; otherwise, it is checked whether the channel is idle at the first time granularity. When the channel is idle, the random number N is reduced by 1. It is subsequently converted to check whether the channel is idle at the second time granularity, and this may continue. When the random number N is reduced to 0, it indicates that the channel is idle and it starts to occupy the channel. However, after the maximum channel occupation duration is over, it is required to perform the channel detection again.

It is to be seen from the above detection process that the size of the CWS determines a value range of the random number N, and there are different parameters for different channel access priorities. Different channel access priorities have different optional values of the CWS. When the channel is accessed for the first time, a minimum value of the CWS is selected. After the channel is detected to be idle for the first time and the maximum channel occupation duration is over, it needs to determine the value of the CWS in the second channel detection based on a reception error rate of data transmission during one of sub-frames (reference subframe) within a channel occupation duration for the first time. For example, if a non-acknowledgement (NACK) ratio of all data transmitted by the base station during the reference sub-frame reaches 80% or more, it means that the channel condition is poor, and the value of the CWS is to be increased, otherwise, it remains unchanged. When the value of the CWS is increased to the maximum and it maintains the maximum number of times, the value of the CWS may be reset to the minimum value.

In the LTE unlicensed spectrum, the adjustment of the CWS is determined by the NACK ratio of Hybrid Automatic Repeat reQuest Acknowledgement (HARQ-ACK) feedback of all data transmitted by the base station during the reference sub-frame. In the LTE, the HARQ is fed back based on a Transport Block, that is, one HARQ-ACK is fed back from one TB. In the NR (New Radio) unlicensed, each TB may be divided into multiple Code Block Groups (CBGs), in which the HARQ-ACK and retransmission may be in units of CBG or TB. Therefore, it is a technical problem to be solved how to determine the NACK ratio based on the HARQ-ACK feedback of CBGs to determine the adjustment of the CWS.

SUMMARY

According to a first aspect of embodiments of the disclosure, there is provided a method for adjusting a CWS. The method is applicable to a data transmission terminal. The method includes:
receiving Hybrid Automatic Repeat reQuest (HARQ) feedback information for first data units and/or second data units from a data reception terminal within a reference duration, the HARQ feedback information including acknowledgement (ACK) information or non-acknowledgement (NACK) information, one second data unit including one or more first data units;
determining target first data units or target second data units, for which the HARQ feedback information is counted as the NACK information;
calculating a NACK ratio within the reference duration based on the determined target first data units and/or target second data units; and
adjusting the CWS based on the NACK ratio.

According to a second aspect of embodiments of the disclosure, there is provided an apparatus for adjusting a CWS. The apparatus includes:
a receiving module, configured to receive Hybrid Automatic Repeat reQuest (HARQ) feedback information for first data units and/or second data units from a data reception terminal within a reference duration, the HARQ feedback information including acknowledgement (ACK) information or non-acknowledgement (NACK) information, one second data unit including one or more first data units;
a determining module, configured to determine target first data units or target second data units, for which the HARQ feedback information received by the receiving module is counted as the NACK information;
a calculation module, configured to calculate a NACK ratio within the reference duration based on the target first data units and/or target second data units determined by the determining module; and
an adjusting module, configured to adjust the CWS based on the NACK ratio calculated by the calculation module.

According to a third aspect of embodiments of the disclosure, there is provided a data transmission device. The data transmission device includes:
a processor; and
a memory configured to store instructions executable by the processor.
The processor is configured to:
receive Hybrid Automatic Repeat reQuest (HARQ) feedback information for first data units and/or second data units from a data reception terminal within a reference duration, the HARQ feedback information including acknowledgement (ACK) information or non-acknowledgement (NACK) information, one second data unit including one or more first data units;

determine target first data units or target second data units, for which the HARQ feedback information is counted as the NACK information;

calculate a NACK ratio within the reference duration based on the determined target first data units and/or target second data units; and adjust the CWS based on the NACK ratio.

According to a fourth aspect of embodiments of the disclosure, there is provided a computer-readable storage medium having computer instructions stored thereon. When the instructions are executed by a processor, actions of the above method for adjusting the CWS are implemented.

The technical solutions provided by the embodiments of the disclosure may include the following beneficial effects.

The target first data units or target second data units, for which the HARQ feedback information is counted as the NACK information, may be determined, and the NACK ratio within the reference duration may be calculated based on the determined target first data units and/or target second data units. Therefore, the NACK ratio calculation is more accurate and the subsequent CWS selection is more reasonable.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
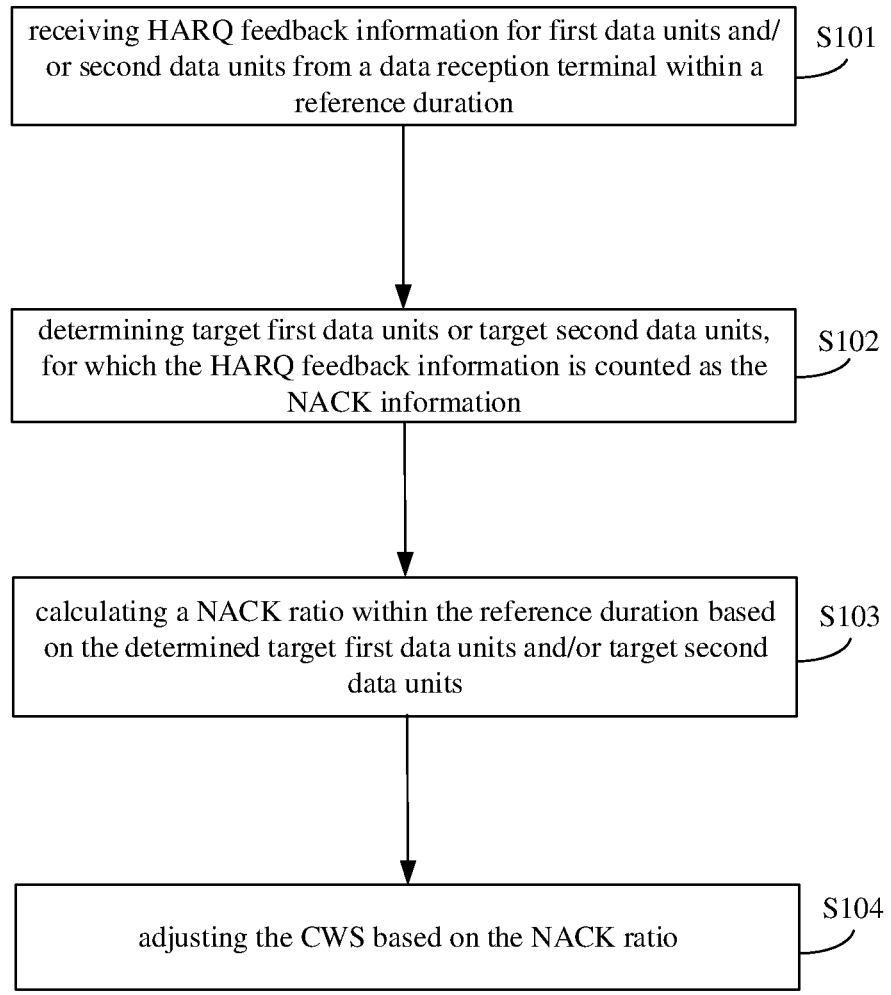
FIG. 1 is a flowchart illustrating a method for adjusting a CWS according to an exemplary embodiment of the disclosure.

FIG. 1 is a flowchart illustrating a method for adjusting a CWS according to an exemplary embodiment of the disclosure. The embodiment may be described from a data transmission terminal. The data transmission terminal may be a base station, and the corresponding data reception terminal may be user equipment (UE). The data transmission terminal may be a UE, and the corresponding data reception terminal may be a base station. The data transmission terminal may be a UE, and the corresponding data reception terminal may also be a UE, such as Device to Device Communication (sidelink) or Internet of Vehicles communication. As illustrated in FIG. 1, the method for adjusting the CWS includes the following.

In step S101, Hybrid Automatic Repeat reQuest (HARQ) feedback information for first data units and/or second data units within a reference duration is received from a data reception terminal. The HARQ feedback information includes acknowledgement (ACK) information or non-acknowledgement (NACK) information. One second data unit includes one or more first data units.

The first data unit may include but be not limited to a Code Block Group (CBG). The second data unit may include but be not limited to a Transport Block (TB).

In step S102, target first data units or target second data units are determined, for which the HARQ feedback information is counted as the NACK information.

After the data transmission terminal receives the HARQ feedback information within the reference duration, it is needed to determine the target first data units or the target second data units, for which the HARQ feedback information is counted as the NACK information.

In embodiments, when the NACK information for first data units that are not transmitted or second data units that are not transmitted is received from the data reception terminal, the NACK information may be ignored, and the first data units that are not transmitted or the second data units that are not transmitted are not determined as the target first data units or the target second data units. All or part of time-frequency resources allocated for the first data units that are not transmitted or the second data units that are not transmitted are pre-empted by other first data units that are transmitted or other second data units that are transmitted.

For example, when the data transmission terminal is a base station, the data reception terminal is a UE, and the first data unit is a CBG, the base station originally plans to transmit CBG #a in a type of enhanced Mobile BroadBand (eMBB) service on this time-frequency resource and notifies UE #a that it needs to receive CBG #a on this time-frequency resource. However, CBG #b of Ultra Reliable Low Latency Communications (URLLC) service with higher delay requirements needs to be transmitted on this time-frequency resource, that is to say, the time-frequency resource of CBG #a is pre-empted. If UE #a feeds back the NACK for CBG #a, the NACK may be ignored, and CBG #a is not determined as the target CBG. If a UE (the UE may be UE #a or other UEs) feeds back the NACK for CBG #b, CBG #b is determined as the target CBG because CB G #b is a CBG that is transmitted.

In embodiments, when the NACK ratio within the reference duration is calculated, the data unit for which the time-frequency resource is pre-empted may be ignored. Because the data unit is not actually transmitted, the NACK information for this CBG may not reflect the channel state. Therefore, ignoring the NACK feedback for this type CBG makes the NACK ratio calculation more accurate and the subsequent CWS selection more reasonable.

In embodiments, when the NACK information for first data units that are transmitted or second data units that are transmitted is received from the data reception terminal, or when the HARQ feedback information for first data units that are transmitted or second data units that are transmitted is not received from the data reception terminal, the first data units that are transmitted or the second data units that are transmitted may be determined as the target first data units or the target second data units. The first data units that are transmitted or the second data units that are transmitted represent, first data units or second data units in which all contents are transmitted.

For example, when the data transmission terminal is a base station, the data reception terminal is a UE, and the first data unit is a CBG, if the base station actually transmits CBG #c, and the feedback received from UE for CBG #c is the NACK or any HARQ feedback information has not received, CBG #c is determined as the target CBG.

In step S103, a NACK ratio within the reference duration is calculated based on the determined target first data units and/or target second data units.

Calculating the NACK ratio within the reference duration based on the determined target first data units and/or target second data units may include but be not limited to the following ways.

Way 1) When the HARQ feedback information received within the reference duration only includes the HARQ feedback information for the first data units, a first number of the target first data units is counted based on the determined target first data units; and the NACK ratio is calculated based on the first number and a number of all first data units that are transmitted within the reference duration.

It continues with the above example. If CBGs in other TBs have been taken into consideration, the numerator and denominator of the NACK ratio obtained are X and Y respectively. That is, in other TBs, the total number of CBGs that may be counted as NACK is X; and the total number of CBGs that are transmitted is Y. For TB #a including CBG #a, supposing that TB #a includes N CBGs, since CBG #a is a CBG that is not actually transmitted due to resource occupation, CBG #a is not the target CBG. Therefore, after removing CBG #a, there are still N−1 CBGs in TB #a, and among these N−1 CBGs, the HARQ feedback of M CBGs may be counted as NACK. Then when the NACK ratio is calculated and the influence of TB #a is considered, the numerator for calculating the NACK ratio turns into X+M, and the denominator turns into Y+N−1 or Y+N.

For example, 3 TBs are transmitted within the reference duration: a total of 4 CBGs are transmitted in TB #1, and 1 CBG may be counted as CBG of NACK, and then the influence of this TB on the numerator of the NACK ratio is adding 1 and the influence of this TB on the denominator of the NACK ratio is adding 4; a total of 3 CBGs are transmitted in TB #2, and 0 CBG may be counted as CBG of NACK, and then the influence of this TB on the numerator of the NACK ratio is adding 0 and the influence of this TB on the denominator of the NACK ratio is adding 3; there are 4 CBGs in TB #3, in which 3 CBGs are transmitted, one CBG that has not transmitted but the corresponding NACK feedback is received (this CBG may not be counted as CBG of NACK, and may be ignored), and one CBG may be counted as CBG of NACK, and then the influence of this TB on the numerator of the NACK ratio is adding 1 and the influence of this TB on the denominator of the NACK ratio is adding 3 or 4. The NACK ratio within the reference duration is $(1+0+1)/(4+3+3)=2/10$ or $(1+0+1)/(4+3+4)=2/11$.

Way 2) When the HARQ feedback information received within the reference duration only includes the HARQ feedback information for the first data units, a ratio of a number of target first data units in each second data unit to a number of first data units that are transmitted in the corresponding second data unit is determined as a NACK ratio in the corresponding second data unit; a sum of NACK ratios in all second data units is calculated; a second number of all second data units that are transmitted within the reference duration is acquired; and the NACK ratio is calculated based on the sum of NACK ratios in all second data units and the second number.

In embodiments, the NACK ratio in each TB is calculated first, and the sum of the NACK ratios in all TBs is calculated. The sum of the NACK ratios is used as the numerator, and the second number of all TBs that are transmitted within the reference duration is used as the denominator. Thus, the NACK ratio is calculated.

For example, 3 TBs are transmitted within the reference duration: 4 CBGs are transmitted in TB #1, and 1 CBG may be counted as CBG of NACK, and then the NACK ratio in the TB is 1/4; a total of 3 CBGs are transmitted in TB #2, and 0 CBG may be counted as CBG of NACK, and then the NACK ratio in the TB is 0; 3 of 4 CBGs in TB #3 are transmitted, there is one CBG that has not transmitted and the corresponding NACK feedback (this CBG may not be counted as CBG of NACK, and may be ignored) is received, and one CBG may be counted as CBG of NACK, and then the NACK ratio of the TB is 1/3 or 1/4. The NACK ratio within the reference duration is $(1/4+0+1/3)/3=7/36$ or $(1/4+0+1/4)/3=1/6$.

Way 3) When the HARQ feedback information received within the reference duration only includes the HARQ feedback information for the second data units, a third number of the target second data units is counted based on the determined target second data units; and the NACK ratio is calculated based on the third number and a number of all second data units that are transmitted within the reference duration.

The second data unit may be a TB, and the calculation method may be similar to the calculation method in Way 1).

For example, there are 4 TBs in the reference duration, one of which is not fully transmitted but the corresponding NACK feedback of UE (this TB may not be counted as TB of NACK, and may be ignored) is received, and there is another TB that may be counted as TB of NACK. The NACK ratio within the reference duration is 1/3 or 1/4.

It is be noted that this calculation way is suitable for the scenario where the data transmission terminal is a base station and the data reception terminal is a UE, and also suitable for the scenario where the data transmission terminal and the data reception terminal are both UEs, for example, D2D or V2X scenario.

Way 4) When the HARQ feedback information received within the reference duration includes the HARQ feedback information for the first data units and the HARQ feedback information for the second data units: with respect to the HARQ feedback information for the first data units, second data units including the first data units may be normalized to acquire NACK ratios in the second data units; with respect to the HARQ feedback information for the second data units, a NACK ratio in the second data unit is determined to be 1 when the second data unit is the target second data unit, and a NACK ratio in the second data unit is determined to be 0 when the second data unit is not the target second data unit; and the NACK ratio is calculated based on a sum of the NACK ratios in all second data units and a number of all second data units that are transmitted within the reference duration.

Similar to the Way 2), the sum of NACK ratios in all second data units, such as TBs, is used as the numerator, and the number of all second data units that are transmitted within the reference duration as the denominator. Thus, the NACK ratio is calculated.

For example, 3 TBs are transmitted within the reference duration: TB #1 is based on the transmission and the HARQ feedback of TB, in which the feedback is ACK, and TB #1 is not counted as TB of NACK, and then the NACK ratio in the TB #1 is 0; TB #2 is based on the transmission and the HARQ feedback of TB, in which the feedback is NACK, and TB #2 is counted as TB of NACK, and then the NACK ratio in this TB is 1; TB #3 is based on the transmission and the HARQ feedback of CBG, in which 3 of 4 CBGs are transmitted, and there is one CBG that is not transmitted but the corresponding NACK feedback (this CBG may not be counted as CBG of NACK, and may be ignored) is received, and one CBG may be counted as CBG of NACK, and then the NACK ratio in this TB #3 is z. The NACK ratio within the reference duration is (1+z)/3. The specific value of z is determined by the following methods.

Normalizing the second data units including the first data units to acquire the NACK ratios in the second data units may include but be not limited to the following scenarios.

Scenario 1) when a ratio of a number of target first data units in the second data unit to a number of first data units in the second data unit reaches a preset ratio, the corresponding second data unit is determined as the target second data unit, and a NACK ratio in the second data unit is determined as 1.

The preset ratio may be set flexibly according needs.

It continues with the above example. TB #3 is based on the transmission and the HARQ feedback of CBG, in which 3 of 4 CBGs are transmitted, and there is one CBG that is not transmitted but the corresponding NACK feedback (this CBG may not be counted as CBG of NACK, and may be ignored) is received, and one CBG may be counted as CBG of NACK, then the NACK ratio in this TB #3 is 1/3. If the preset ratio is 1/4, the TB is counted as the target TB of NACK and the NACK ratio in TB #3 is 1, that is, z=1. Then the value of z may be introduced into the NACK ratio value (1+z)/3 within the reference duration, the NACK ratio within the reference duration is 2/3.

Scenario 2) a NACK ratio in the second data unit is acquired based on a ratio of a number of target first data units in the second data unit to a number of first data units in the second data unit.

For example, TB #3 is based on the transmission and the HARQ feedback of TB, in which 3 of 4 CBGs are transmitted, and there is one CBG that is not transmitted and the corresponding NACK feedback (this CBG may not be counted as CBG of NACK, and may be ignored) is received, and one CBG may be counted as CBG of NACK, then the NACK ratio in this TB #3 is 1/3, that is, z=1/3. Then the value of z is introduced into the NACK ratio value (1+z)/3 within the reference duration, and the NACK ratio within the reference duration is 4/9.

It can be seen that the embodiment may normalize the second data units in which the HARQ feedback proceeds based on the first data units through multiple methods and may be implemented flexibly.

In embodiments, for different HARQ feedback information, multiple methods may be adopted to calculate the NACK ratio within the reference duration, which may be implemented flexibly with a high accuracy.

In step S104, the CWS is adjusted based on the NACK ratio.

When the data transmission terminal is a base station and the data reception terminal is a terminal, adjusting the CWS based on the NACK ratio may include: when the NACK ratio is greater than a preset threshold, increasing a value of the CWS. In addition, when a number of times that the value of the CWS maintains a preset maximum value, reaches a preset number of times, the value of the CWS is set to a preset minimum value.

When the data transmission terminal is a terminal and the data reception terminal is a base station, or when the data transmission terminal is a terminal and the data reception terminal is another terminal, adjusting the CWS based on the NACK ratio may include: when the NACK ratio is less than 1, setting a value of the CWS to a preset minimum value.

In embodiments, the target first data units or target second data units, for which the HARQ feedback information is counted as the NACK information, may be determined, and the NACK ratio within the reference duration may be calculated based on the determined target first data units and/or target second data units. Therefore, the NACK ratio calculation is more accurate and the subsequent CWS selection is more reasonable.

Figure 2:
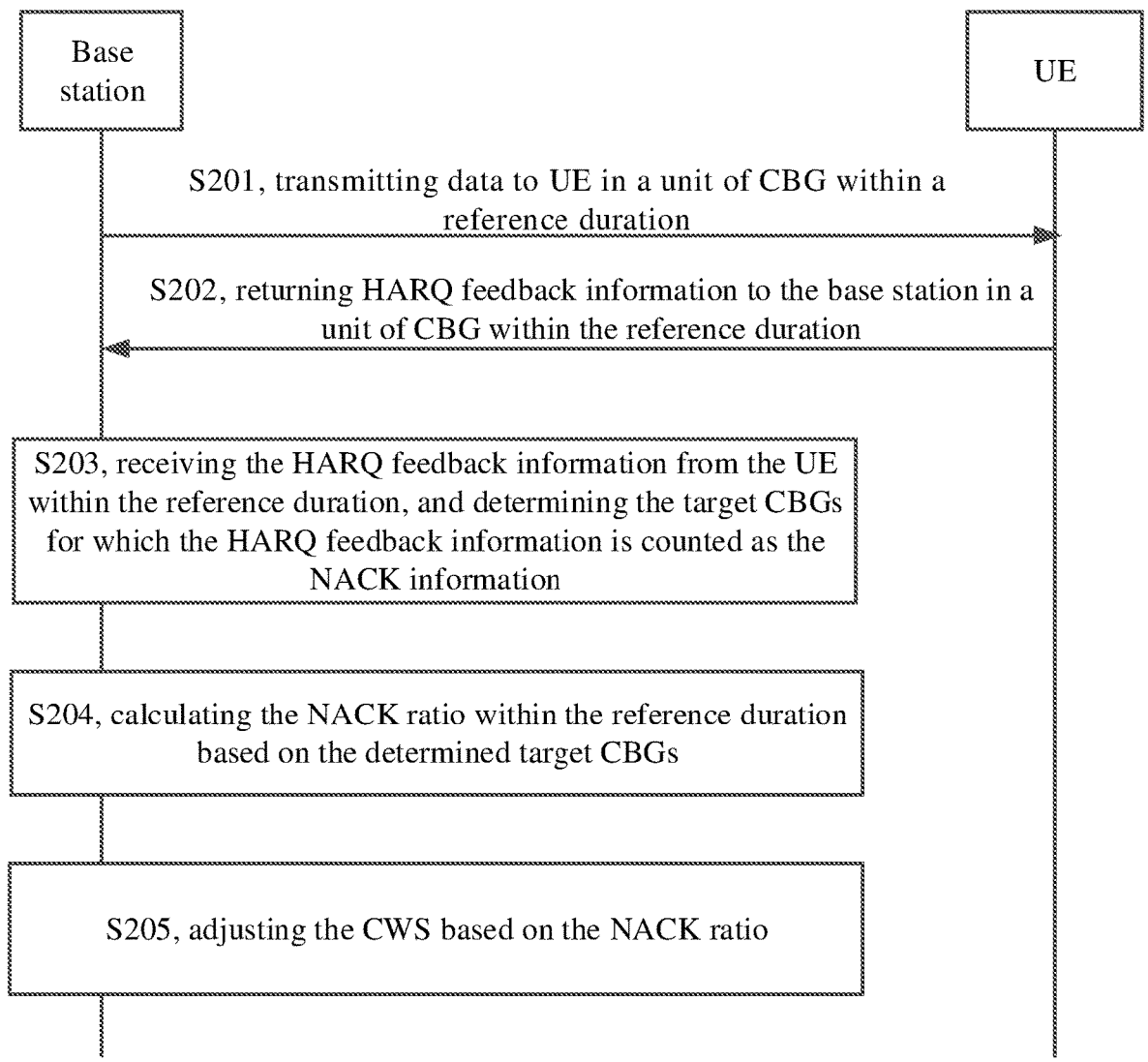
FIG. 2 is a signaling flowchart illustrating a method for adjusting a CWS according to an exemplary embodiment of the disclosure.

FIG. 2 is a signaling flowchart illustrating a method for adjusting a CWS according to an exemplary embodiment of the disclosure. The embodiment may be described from the perspective of interaction between the base station and the UE. The base station is the data transmission terminal and the UE is the data reception terminal. The method for adjusting the CWS includes the following.

In step S201, the base station transmits data to the UE in a unit of CBG within a reference duration.

In step S202, the UE returns HARQ feedback information to the base station in a unit of CBG within the reference duration. The HARQ feedback information includes ACK information or NACK information.

In step S203, the base station receives the HARQ feedback information from the UE within the reference duration, and determines the target CBGs for which the HARQ feedback information is counted as the NACK information.

In step S204, the NACK ratio within the reference duration is calculated based on the determined target CBGs.

In step S205, the base station adjusts the CWS based on the NACK ratio.

In embodiments, through the interaction between the base station and the UE, the base station may calculate the NACK ratio within the reference duration based on the determined target CBGs, so that the NACK ratio calculation is more accurate and the subsequent CWS selection is more reasonable.

Figure 3:
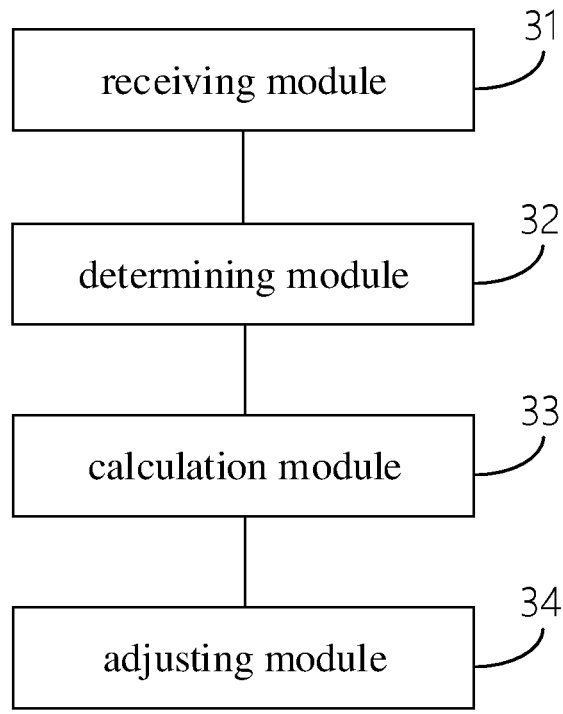
FIG. 3 is a block diagram illustrating an apparatus for adjusting a CWS according to an exemplary embodiment.

FIG. 3 is a block diagram illustrating an apparatus for adjusting a CWS according to an exemplary embodiment. The apparatus may be applicable to the data transmission terminal. The data transmission terminal may be a base station, and the corresponding data reception terminal may be a UE. The data transmission terminal may be a UE, and the corresponding data reception terminal may be a base station. The data transmission terminal may be a UE, and the corresponding data reception terminal may also be a UE, such as Device to Device Communication (sidelink) or Internet of Vehicles communication. As illustrated in FIG. 3, the apparatus includes a receiving module 31, a determining module 32, a calculation module 33, and an adjusting module 34.

The receiving module 31 is configured to receive Hybrid Automatic Repeat reQuest (HARQ) feedback information for first data units and/or second data units from a data reception terminal within a reference duration. The HARQ feedback information includes acknowledgement ACK information or non-acknowledgement NACK information. One second data unit includes one or more first data units.

The first data unit may include but be not limited to a Code Block Group (CBG). The second data unit may include but be not limited to a Transport Block (TB).

The determining module 32 is configured to determine target first data units or target second data units, for which the HARQ feedback information received by the receiving module 31 is counted as the NACK information.

In embodiments, when the NACK information for first data units that are not transmitted or second data units that are not transmitted is received from the data reception terminal, the NACK information may be ignored, and the first data units that are not transmitted or the second data units that are not transmitted are not determined as the target first data units or the target second data units. All or part of time-frequency resources allocated for the first data units that are not transmitted or the second data units that are not transmitted are pre-empted by other first data units that are transmitted or other second data units that are transmitted.

For example, when the data transmission terminal is a base station, the data reception terminal is a UE, and the first data unit is a CBG, the base station originally plans to transmit CBG #a in a type of enhanced Mobile BroadBand (eMBB) service on this time-frequency resource and notifies UE #a that it needs to receive CBG #a on this time-frequency resource. However, CBG #b of Ultra Reliable Low Latency Communications (URLLC) service with higher delay requirements needs to be transmitted on this time-frequency resource, that is to say, the time-frequency resource of CBG #a is pre-empted. If UE #a feeds back the NACK for CBG #a, the NACK may be ignored, and CBG #a is not determined as the target CBG. If a UE (the UE may be UE #a or other UEs) feeds back the NACK for CBG #b, CBG #b is determined as the target CBG because CB G #b is a CBG that is transmitted.

In embodiments, when the NACK ratio within the reference duration is calculated, the data unit for which the time-frequency resource is pre-empted may be ignored. Because the data unit is not actually transmitted, the NACK information for this CBG may not reflect the channel state. Therefore, ignoring the NACK feedback for this type CBG makes the NACK ratio calculation more accurate and the subsequent CWS selection more reasonable.

In embodiments, when the NACK information for first data units that are transmitted or second data units that are transmitted is received from the data reception terminal, or when the HARQ feedback information for first data units that are transmitted or second data units that are transmitted is not received from the data reception terminal, the first data units that are transmitted or the second data units that are transmitted may be determined as the target first data units or the target second data units. The first data units that are transmitted or the second data units that are transmitted represent, first data units or second data units in which all contents are transmitted.

For example, when the data transmission terminal is a base station, the data reception terminal is a UE, and the first data unit is a CBG, if the base station actually transmits CBG #c, and the feedback received from UE for CBG #c is the NACK or any HARQ feedback information has not received, CBG #c is determined as the target CBG.

The calculation module 33 is configured to calculate a NACK ratio within the reference duration based on the target first data units and/or target second data units determined by the determining module 32.

The adjusting module 34 is configured to adjust the CWS based on the NACK ratio calculated by the calculation module 33.

When the data transmission terminal is a base station and the data reception terminal is a terminal, adjusting the CWS based on the NACK ratio may include: when the NACK ratio is greater than a preset threshold, increasing a value of the CWS. In addition, when a number of times that the value of the CWS maintains a preset maximum value, reaches a preset number of times, the value of the CWS is set to a preset minimum value.

When the data transmission terminal is a terminal and the data reception terminal is a base station, or when the data transmission terminal is a terminal and the data reception terminal is another terminal, adjusting the CWS based on the NACK ratio may include: when the NACK ratio is less than 1, setting a value of the CWS to a preset minimum value.

In embodiments, the target first data units or target second data units, for which the HARQ feedback information is counted as the NACK information, may be determined, and the NACK ratio within the reference duration may be calculated based on the determined target first data units and/or target second data units. Therefore, the NACK ratio calculation is more accurate and the subsequent CWS selection is more reasonable.

Figure 4:
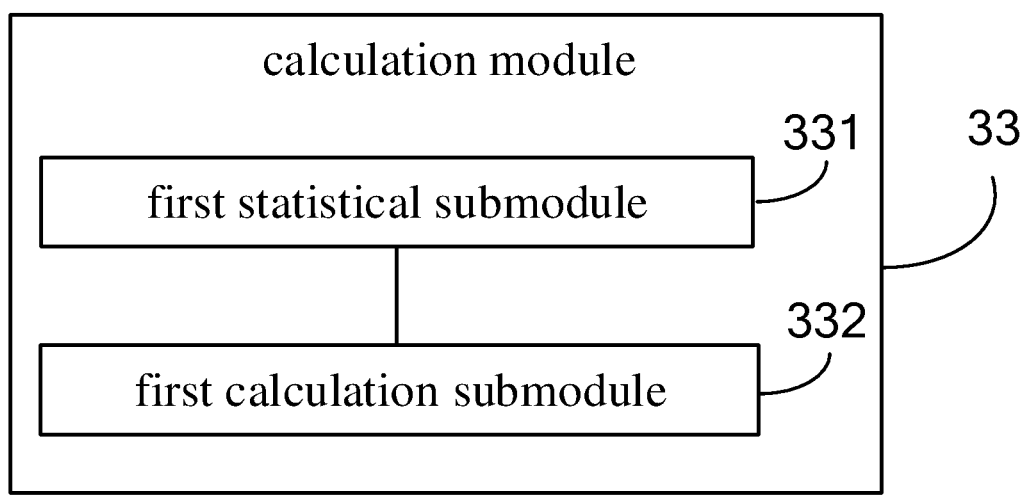
FIG. 4 is a block diagram illustrating another apparatus for adjusting a CWS according to an exemplary embodiment.

FIG. 4 is a block diagram illustrating another apparatus for adjusting a CWS according to an exemplary embodiment. As illustrated in the FIG. 4, based on the foundation of the embodiments illustrated in FIG. 3, when the HARQ feedback information received within the reference duration only includes the HARQ feedback information for the first data units, the calculation module 33 may include a first statistical submodule 331 and a first calculation submodule 332.

The first statistical submodule 331 is configured to count a first number of the target first data units based on the determined target first data units.

The first calculation submodule 332 is configured to calculate the NACK ratio based on the first number acquired by the first statistical submodule 331 and a number of all first data units that are transmitted within the reference duration.

If CBGs in other TBs have been taken into consideration, the numerator and denominator of the NACK ratio obtained are X and Y respectively. That is, in other TBs, the total number of CBGs that may be counted as NACK is X; and the total number of CBGs that are transmitted is Y. For TB #a including CBG #a, supposing that TB #a includes N CBGs, since CBG #a is a CBG that is not actually transmitted due to resource occupation, CBG #a is not the target CBG. Therefore, after removing CBG #a, there are still N−1 CBGs in TB #a, and among these N−1 CBGs, the HARQ feedback of M CBGs may be counted as NACK. Then when the NACK ratio is calculated and the influence of TB #a is considered, the numerator for calculating the NACK ratio turns into X+M, and the denominator turns into Y+N−1 or Y+N.

For example, 3 TBs are transmitted within the reference duration: a total of 4 CBGs are transmitted in TB #1, and 1 CBG may be counted as CBG of NACK, and then the influence of this TB on the numerator of the NACK ratio is adding 1 and the influence of this TB on the denominator of the NACK ratio is adding 4; a total of 3 CBGs are transmitted in TB #2, and 0 CBG may be counted as CBG of NACK, and then the influence of this TB on the numerator of the NACK ratio is adding 0 and the influence of this TB on the denominator of the NACK ratio is adding 3; there are 4 CBGs in TB #3, in which 3 CBGs are transmitted, one CBG that has not transmitted but the corresponding NACK feedback is received (this CBG may not be counted as CBG of NACK, and may be ignored), and one CBG may be counted as CBG of NACK, and then the influence of this TB on the numerator of the NACK ratio is adding 1 and the influence of this TB on the denominator of the NACK ratio is adding 3 or 4. The NACK ratio within the reference duration is $(1+0+1)/(4+3+3)=2/10$ or $(1+0+1)/(4+3+4)=2/11$.

In embodiments, the NACK ratio is calculated based on the first number calculated by the first statistical submodule and the number of all first data units that are transmitted within the reference duration, so that the calculated NACK ratio has a high accuracy rate.

Figure 5:
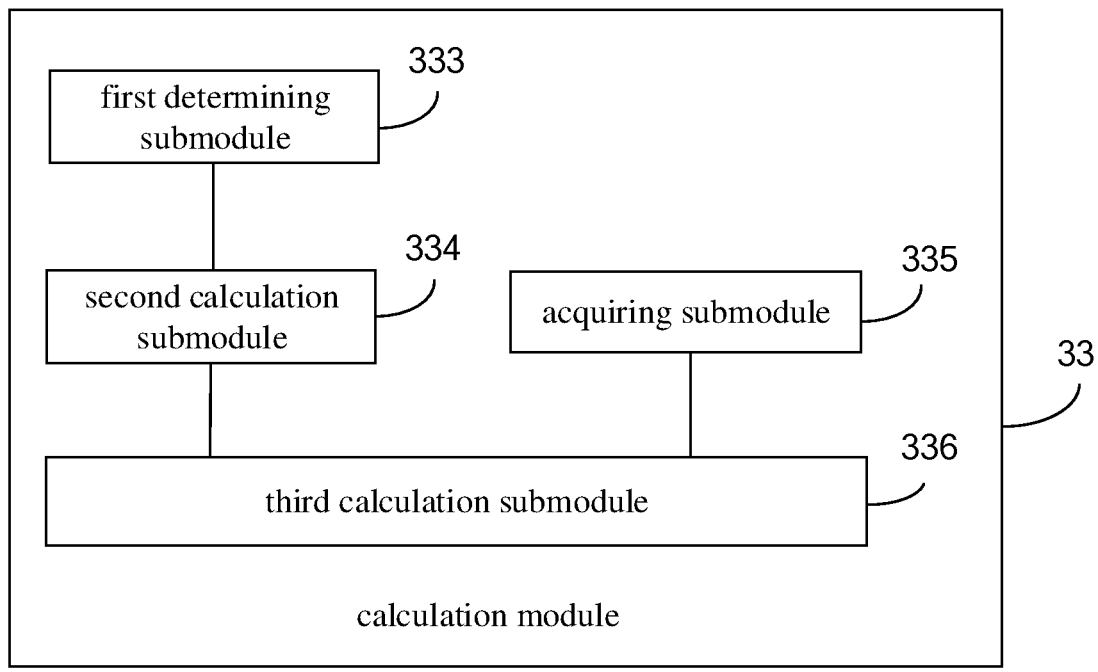
FIG. 5 is a block diagram illustrating another apparatus for adjusting a CWS according to an exemplary embodiment.

FIG. 5 is a block diagram illustrating another apparatus for adjusting a CWS according to an exemplary embodiment. As illustrated in the FIG. 5, based on the foundation of the embodiments illustrated in FIG. 3, when the HARQ feedback information received within the reference duration only includes the HARQ feedback information for the first data units, the calculation module 33 may include: a first determining submodule 333, a second calculation submodule 334, an acquiring submodule 335, and a third calculation submodule 336.

The first determining submodule 333 is configured to determine a ratio of a number of target first data units in each second data unit to a number of first data units that are transmitted in the corresponding second data unit as a NACK ratio in the corresponding second data unit.

The second calculation submodule 334 is configured to calculate a sum of NACK ratios in all second data units.

The acquiring submodule 335 is configured to acquire a second number of all second data units that are transmitted within the reference duration.

The third calculation submodule 336 is configured to calculate the NACK ratio based on the sum of NACK ratios in all second data units, acquired by the second calculation submodule 334, and the second number acquired by the acquiring submodule 335.

In embodiments, the NACK ratio in each TB is calculated first, and the sum of the NACK ratios in all TBs is calculated. The sum of the NACK ratios is used as the numerator, and the second number of all TBs that are transmitted within the reference duration is used as the denominator. Thus, the NACK ratio is calculated.

For example, 3 TBs are transmitted within the reference duration: 4 CBGs are transmitted in TB #1, and 1 CBG may be counted as CBG of NACK, and then the NACK ratio in the TB is 1/4; a total of 3 CBGs are transmitted in TB #2, and 0 CBG may be counted as CBG of NACK, and then the NACK ratio in the TB is 0; 3 of 4 CBGs in TB #3 are transmitted, there is one CBG that has not transmitted and the corresponding NACK feedback (this CBG may not be counted as CBG of NACK, and may be ignored) is received, and one CBG may be counted as CBG of NACK, and then the NACK ratio of the TB is 1/3 or 1/4. The NACK ratio within the reference duration is $(1/4+0+1/3)/3=7/36$ or $(1/4+0+1/4)/3=1/6$.

In embodiments, the NACK ratio is calculated based on the sum of the NACK ratios in all the second data units calculated by the second calculation submodule and the second number acquired by the acquiring submodule, so that the calculated NACK ratio has a high accuracy rate.

Figure 6:
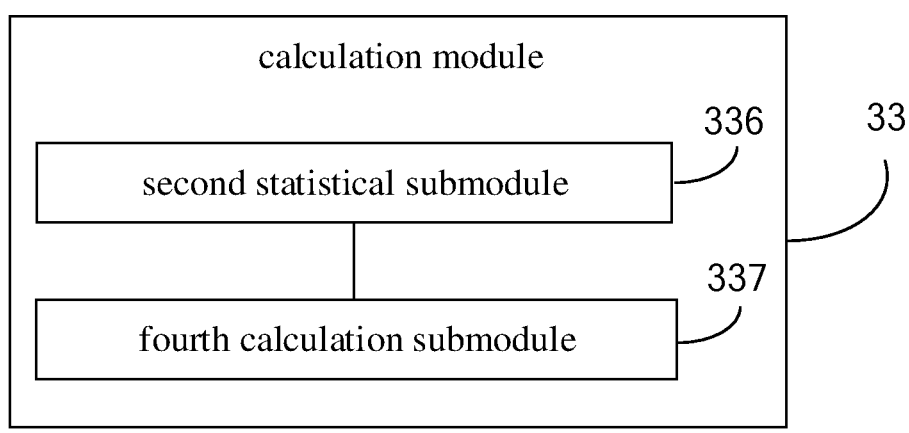
FIG. 6 is a block diagram illustrating another apparatus for adjusting a CWS according to an exemplary embodiment.

FIG. 6 is a block diagram illustrating another apparatus for adjusting a CWS according to an exemplary embodiment. As illustrated in FIG. 6, based on the foundation of the embodiments illustrated in FIG. 3, when the HARQ feedback information received within the reference duration only includes the HARQ feedback information for the second data units, the calculation module 33 may include: a second statistical submodule 336 and a fourth calculation submodule 337.

The second statistical submodule 336 is configured to count a third number of the target second data units based on the determined target second data units.

The fourth calculation submodule 337 is configured to calculate the NACK ratio based on the third number calculated by the second statistical submodule 336 and a number of all second data units that are transmitted within the reference duration.

The second data unit may be a TB, and the calculation method may be similar to the calculation method in Way 1).

For example, there are 4 TBs in the reference duration, one of which is not fully transmitted but the corresponding NACK feedback of UE (this TB may not be counted as TB of NACK, and may be ignored) is received, and there is another TB that may be counted as TB of NACK. The NACK ratio within the reference duration is 1/3 or 1/4.

It is be noted that this calculation way is suitable for the scenario where the data transmission terminal is a base station and the data reception terminal is a UE, and also suitable for the scenario where the data transmission terminal and the data reception terminal are both UEs, for example, D2D or V2X scenario.

In embodiments, the NACK ratio is calculated based on the third number calculated by the second statistical submodule and the number of all second data units that are transmitted within the reference duration, so that the calculated NACK ratio has a high accuracy rate.

Figure 7:
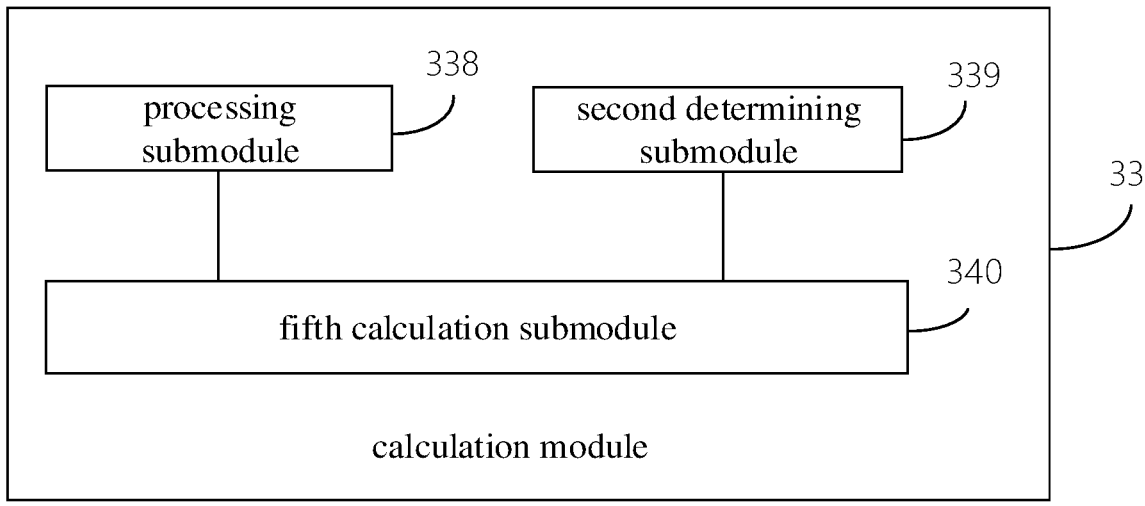
FIG. 7 is a block diagram illustrating another apparatus for adjusting a CWS according to an exemplary embodiment.

FIG. 7 is a block diagram illustrating another apparatus for adjusting a CWS according to an exemplary embodiment. As illustrated in the FIG. 7, based on the foundation of the embodiments illustrated in FIG. 3, when the HARQ feedback information received within the reference duration includes the HARQ feedback information for the first data units and the HARQ feedback information for the second data units, the calculation module 33 may include: a processing submodule 338, a second determining submodule 339, and a fifth calculation submodule 340.

The processing submodule 338 is configured to, with respect to the HARQ feedback information for the first data units, normalize second data units including the first data units to acquire NACK ratios in the second data units.

The second determining submodule 339 is configured to, with respect to the HARQ feedback information for the second data units, determine a NACK ratio in the second data unit to be 1 when the second data unit is the target second data unit, and determine a NACK ratio in the second data unit to be 0 when the second data unit is not the target second data unit.

The fifth calculation submodule 340 is configured to calculate the NACK ratio based on a sum of the NACK ratios in all second data units acquired by the processing submodule 338 and the second determining submodule 339, and a number of all second data units that are transmitted within the reference duration.

For example, 3 TBs are transmitted within the reference duration: TB #1 is based on the transmission and the HARQ feedback of TB, in which the feedback is ACK, and TB #1 is not counted as TB of NACK, and then the NACK ratio in the TB #1 is 0; TB #2 is based on the transmission and the HARQ feedback of TB, in which the feedback is NACK, and TB #2 is counted as TB of NACK, and then the NACK ratio in this TB is 1; TB #3 is based on the transmission and the HARQ feedback of CBG, in which 3 of 4 CBGs are transmitted, and there is one CBG that is not transmitted but the corresponding NACK feedback (this CBG may not be counted as CBG of NACK, and may be ignored) is received, and one CBG may be counted as CBG of NACK, and then the NACK ratio in this TB #3 is z. The NACK ratio within the reference duration is (1+z)/3. The specific value of z is determined by the following methods.

In embodiments, the NACK ratio is calculated based on the sum of the NACK ratios in all second data units acquired by the processing submodule and the second determining submodule and the number of all second data units that are transmitted within the reference duration, so that the calculated NACK ratio has a high accuracy rate.

Figure 8:
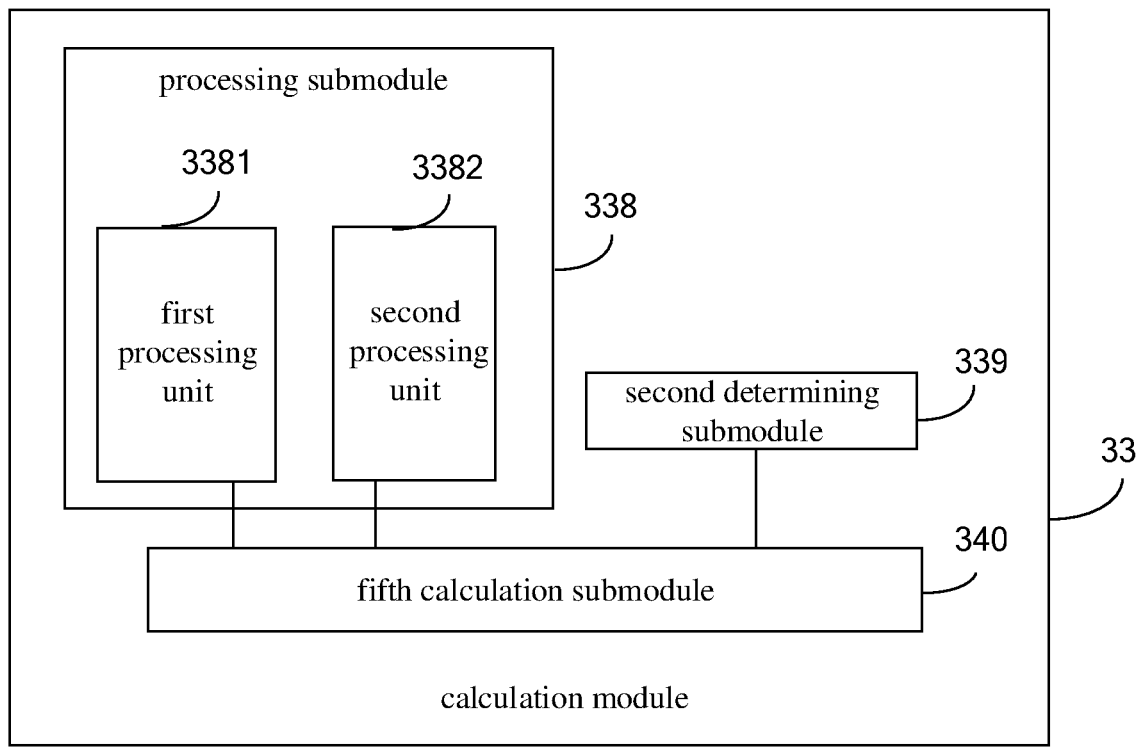
FIG. 8 is a block diagram illustrating another apparatus for adjusting a CWS according to an exemplary embodiment.

FIG. 8 is a block diagram illustrating another apparatus for adjusting a CWS according to an exemplary embodiment. As illustrated in the FIG. 8, based on the base station of the embodiments illustrated in FIG. 7, the processing submodule 338 may include: a first processing unit 3381 and a second processing unit 3382.

The first processing unit 3381 is configured to, when a ratio of a number of target first data units in the second data unit to a number of first data units in the second data unit reaches a preset ratio, determine the corresponding second data unit as the target second data unit, and a NACK ratio in the second data unit as 1.

The preset ratio may be set flexibly according needs.

It continues with the above example. TB #3 is based on the transmission and the HARQ feedback of CBG, in which 3 of 4 CBGs are transmitted, and there is one CBG that is not transmitted but the corresponding NACK feedback (this CBG may not be counted as CBG of NACK, and may be ignored) is received, and one CBG may be counted as CBG of NACK, then the NACK ratio in this TB #3 is 1/3. If the preset ratio is 1/4, the TB is counted as the target TB of NACK and the NACK ratio in TB #3 is 1, that is, z=1. Then the value of z may be introduced into the NACK ratio value (1+z)/3 within the reference duration, the NACK ratio within the reference duration is 2/3.

The second processing submodule 3382 is configured to acquire a NACK ratio in the second data unit based on a ratio of a number of target first data units in the second data unit to a number of first data units in the second data unit.

For example, TB #3 is based on the transmission and the HARQ feedback of TB, in which 3 of 4 CBGs are transmitted, and there is one CBG that is not transmitted and the corresponding NACK feedback (this CBG may not be counted as CBG of NACK, and may be ignored) is received, and one CBG may be counted as CBG of NACK, then the NACK ratio in this TB #3 is 1/3, that is, z=1/3. Then the value of z is introduced into the NACK ratio value (1+z)/3 within the reference duration, and the NACK ratio within the reference duration is 4/9.

In embodiments, the second data units in which the HARQ feedback proceeds based on the first data units may be normalized through multiple methods and may be implemented flexibly.

The embodiments also provide a data transmission device. The data transmission device includes:
a processor; and
a memory configured to store instructions executable by the processor.

The processor is configured to:
receive HARQ feedback information for first data units and/or second data units from a data reception terminal within a reference duration, the HARQ feedback information comprising acknowledgement ACK information or non-acknowledgement NACK information, one second data unit comprising one or more first data units;
determine target first data units or target second data units, for which the HARQ feedback information is counted as the NACK information;
calculate a NACK ratio within the reference duration based on the determined target first data units and/or target second data units; and
adjust the CWS based on the NACK ratio.

The data transmission device may be a UE, or a base station.

Figure 9:
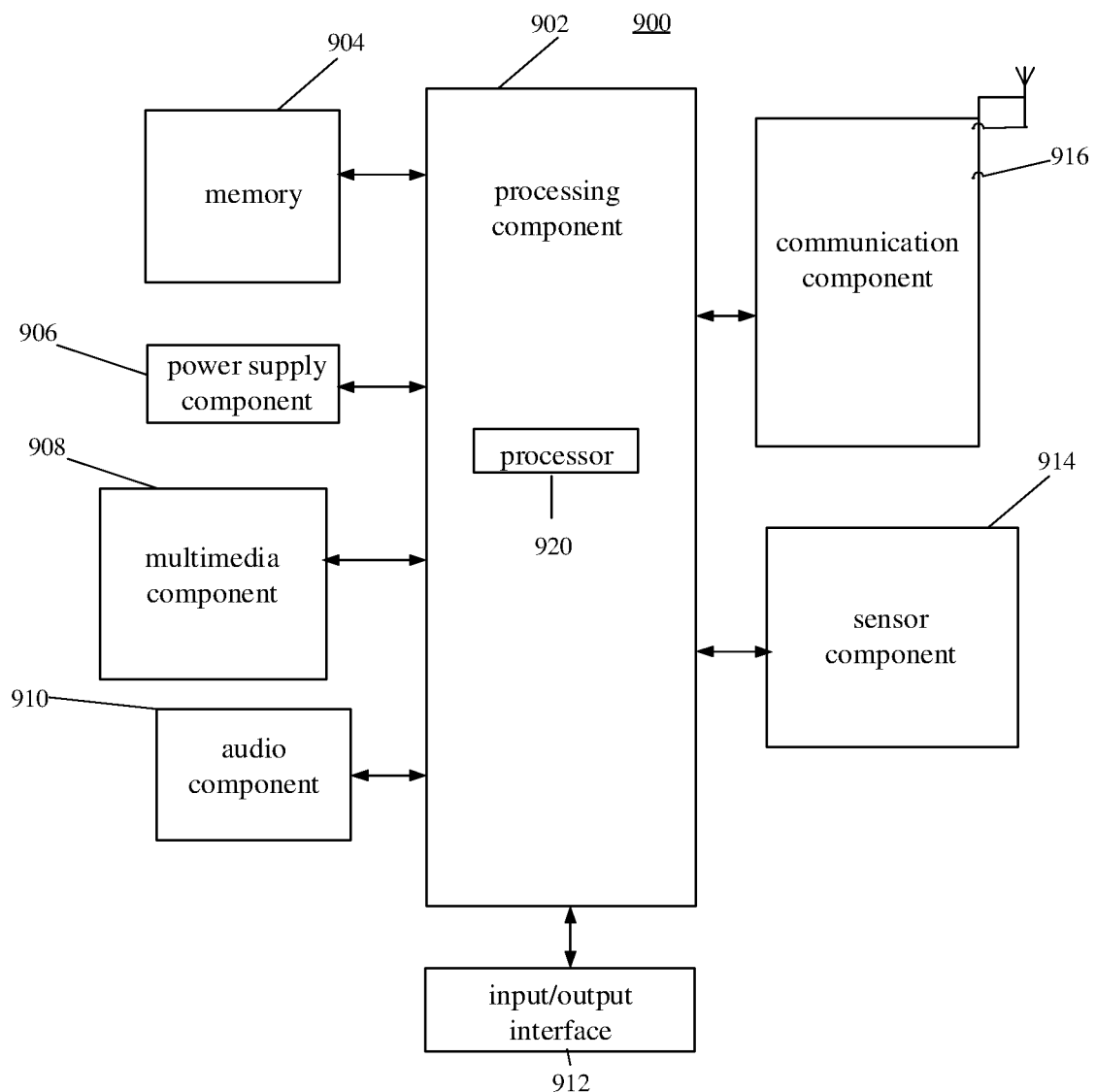
FIG. 9 is a block diagram illustrating a device suitable for adjusting a CWS according to an exemplary embodiment.

FIG. 9 is a block diagram illustrating a device suitable for adjusting a CWS according to an exemplary embodiment. For example, the device 900 may be a mobile phone, a computer, a digital broadcasting terminal, a messaging device, a game console, a tablet device, a medical device, a fitness device, a personal digital assistant, etc.

According to FIG. 9, the device 900 may include one or more of the following components: processing component 902, memory 904, power supply component 906, multimedia component 908, audio component 910, input/output (I/O) interface 912, sensor component 914, and communication component 916.

The processing component 902 generally controls the overall operations of the device 900, such as operations associated with display, phone calls, data communications, camera operations and recording. The processing component 902 may include one or more processors 920 to execute instructions to complete all or part of the steps of the aforementioned methods. In addition, the processing component 902 may include one or more modules to facilitate the interaction between the processing component 902 and other components. For example, the processing component 902 may include a multimedia module to facilitate the interaction between the multimedia component 908 and the processing component 902.

A processor 920 in the processing module 902 may be configured to:
receive HARQ feedback information for first data units and/or second data units from a data reception terminal within a reference duration, the HARQ feedback information including ACK information or NACK information, one second data unit including one or more first data units;
determine target first data units or target second data units, for which the HARQ feedback information is counted as the NACK information;
calculate a NACK ratio within the reference duration based on the determined target first data units and/or target second data units; and
adjust the CWS based on the NACK ratio.

The memory 904 is configured to store various types of data to support operations on the device 900. Examples of these data include instructions for any application or method operating on the device 900, such as contact data, phone book data, messages, pictures, videos, and so on. The memory 904 may be implemented by any type of volatile or non-volatile storage device or their combination, such as Static Random Access Memory (SRAM), Electrically Erasable Programmable Read-Only Memory (EEPROM), Erasable and Programmable Read-Only Memory (EPROM), Programmable Read-Only Memory (PROM), Read-Only Memory (ROM), magnetic memory, flash memory, magnetic disk or optical disk.

The power supply component 906 provides power for various components of the device 900. The power supply component 906 may include a power management system, one or more power supplies, and other components associated with the generation, management, and distribution of power for the device 900.

The multimedia component 908 includes a screen that provides an output interface between the device 900 and a user. In some embodiments, the screen may include a Liquid Crystal Display (LCD) and a Touch Panel (TP). If the screen includes a touch panel, the screen may be used as a touch screen to receive input signals from the user. The touch panel includes one or more touch sensors to sense touch, slide, and gestures on the touch panel. The touch sensor may not only sense the boundary of a touch or slide action, but also detect the duration and pressure related to the touch or slide operation. In some embodiments, the multimedia component 908 includes a front camera and/or a rear camera. When the device 900 is in an operation mode, such as a shooting mode or a video mode, the front camera and/or the rear camera may receive external multimedia data. Each front camera and rear camera can be a fixed optical lens system or have focal length and optical zoom capability.

The audio component 910 is configured to output and/or input audio signals. For example, the audio component 910 includes a microphone (MIC). When the device 900 is in an operation mode, such as a call mode, a recording mode, and a voice recognition mode, the microphone is configured to receive external audio signals. The received audio signal can be further stored in the memory 904 or transmitted through the communication component 916. In some embodiments, the audio component 910 includes a speaker for outputting audio signals.

The I/O interface 912 provides an interface between the processing component 902 and the peripheral interface module. The peripheral interface module may be a keyboard, a click wheel, a button, and so on. These buttons may include but are not limited to: home button, volume button, start button, and lock button.

The sensor component 914 includes one or more sensors for providing the device 900 with various aspects of status assessment. For example, the sensor component 914 may detect the on/off state of the device 900 and relative position of components, for example, components as the display and the keypad of the device 900. The sensor component 914 may also detect position changes of device 900 or one component of device 900, and the presence or absence of contact between a user and the device 900, the position or acceleration/deceleration of the device 900, and the temperature change of the device 900. The sensor component 914 may include a proximity sensor, which is configured to detect the presence of nearby objects when there is no physical contact. The sensor component 914 may also include a light sensor, such as a CMOS or CCD image sensor for imaging applications. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and other devices. The device 900 may get access to a wireless network based on the communication standard, such as Wi-Fi, 2G or 3G, or their combinations. In exemplary embodiments, the communication component 916 receives a broadcast signal or related broadcast information from an external broadcast management system through a broadcast channel. In exemplary embodiments, the communication component 916 further includes a near field communication (NFC) module to facilitate short-range communication. For example, the NFC module can be implemented based on radio frequency identification (RFID) technology, infrared data association (IrDA) technology, ultra-wide band (UWB) technology, blue tooth (BT) technology and other technologies.

In exemplary embodiments, the device 900 may be implemented by one or more Application Specific Integrated Circuits (ASIC), Digital Signal Processors (DSP), Digital Signal Processing Devices (DSPD), Programmable Logic Devices (PLD), Field-Programmable Gate Array (FPGA), controller, micro-controller, microprocessor, or other electronic components, for performing the above methods.

In exemplary embodiments, there is also provided a non-transitory computer-readable storage medium including instructions, such as a memory 904 including instructions. The instructions may be executed by the processor 920 of the device 900 to complete the above methods. For example, the non-transitory computer-readable storage medium may be a Read-Only Memory (ROM), a Random-Access Memory (RAM), a CD-ROM, a magnetic tape, a floppy disk, an optical data, a storage device, etc.

Figure 10:
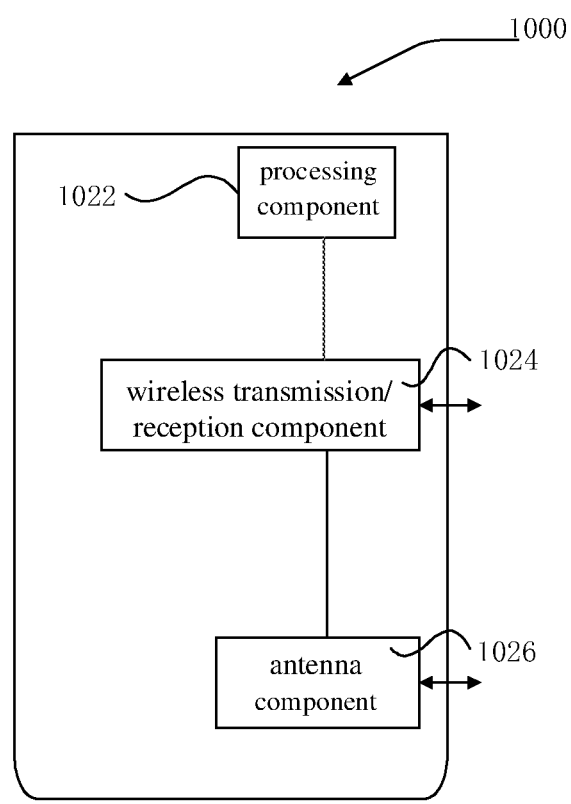
FIG. 10 is a block diagram illustrating another device suitable for adjusting a CWS according to an exemplary embodiment.

FIG. 10 is a block diagram illustrating another device suitable for adjusting a CWS according to an exemplary embodiment. The device 1000 may be provided as a base station. Referring to FIG. 10, the device 1000 includes a processing component 1022, a wireless transmission/reception component 1024, an antenna component 1026, and a signal processing part especially for wireless interface. The processing component 1022 may further include one or more processors.

A processor in the processing module 1022 may be configured to:
receive HARQ feedback information for first data units and/or second data units from a data reception terminal within a reference duration, the HARQ feedback information including ACK information or NACK information, one second data unit including one or more first data units;
determine target first data units or target second data units, for which the HARQ feedback information is counted as the NACK information;
calculate a NACK ratio within the reference duration based on the determined target first data units and/or target second data units; and
adjust the CWS based on the NACK ratio.

In exemplary embodiments, there is also provided a non-transitory computer-readable storage medium including instructions. The instructions may be executed by the processing component 1022 of the device 1000 to complete the above methods for adjusting the CWS. For example, the non-transitory computer-readable storage medium may be a Read-Only Memory (ROM), a Random-Access Memory (RAM), a CD-ROM, a magnetic tape, a floppy disk, an optical data, a storage device, etc.

As for the apparatus/device embodiments, since they basically correspond to the method embodiments, reference may be made to the description of the method embodiments for related parts. The apparatus/device embodiments described above are merely illustrative, where the units described as separate components may or may not be physically separated, and the components displayed as units may or may not be physical units, that is, they may be located in one place, or may be distributed to multiple network units. Some or all of the modules may be selected according to actual needs to achieve the purpose of solutions of the embodiments. Those skilled in the art may understand and implement them without creative work.

It is to be noted that in the disclosure, relational terms such as first and second are only used to distinguish one entity or operation from another entity or operation, and do not necessarily require or imply actual relationships or sequences between these entities or operations. Terms such as "include" or any other variants in which are intended to cover non-exclusive inclusion, so that processes, methods, products or devices including a series of elements not only includes those elements, but also includes other elements not explicitly listed, or further include elements inherent to such processes, methods, products or devices. If there are no more restrictions, the element defined by the sentence "including a . . . " does not exclude the existence of other same elements in the process, method, good or equipment including elements.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A method for adjusting a contention window size (CWS), applicable to a data transmission terminal, comprising:
   receiving Hybrid Automatic Repeat reQuest (HARQ) feedback information for first data units and/or second data units from a data reception terminal within a reference duration, the HARQ feedback information comprising acknowledgement (ACK) information or non-acknowledgement (NACK) information, one second data unit comprising one or more first data units;
   determining target first data units or target second data units, for which the HARQ feedback information is counted as the NACK information;
   calculating a NACK ratio within the reference duration based on the determined target first data units and/or target second data units; and
   adjusting the CWS based on the NACK ratio.

2. The method of claim 1, wherein determining the target first data units or the target second data units, for which the HARQ feedback information is counted as the NACK information, comprises:
   when receiving the NACK information for first data units that are not transmitted or second data units that are not transmitted, from the data reception terminal, ignoring the NACK information, and determining the first data units that are not transmitted or the second data units that are not transmitted not as the target first data units or the target second data units;
   wherein all or part of time-frequency resources allocated for the first data units that are not transmitted or the second data units that are not transmitted are pre-empted by other first data units that are transmitted or other second data units that are transmitted.

3. The method of claim 1, wherein determining the target first data units or the target second data units, for which the HARQ feedback information is counted as the NACK information, comprises:
   when receiving the NACK information for first data units that are transmitted or second data units that are transmitted, from the data reception terminal, or when not receiving the HARQ feedback information for first data units that are transmitted or second data units that are transmitted, from the data reception terminal, determining the first data units that are transmitted or the second data units that are transmitted as the target first data units or the target second data units;
   wherein the first data units that are transmitted or the second data units that are transmitted, represent first data units or second data units in which all contents are transmitted.

4. The method of claim 2, wherein when the HARQ feedback information received within the reference duration only comprises the HARQ feedback information for the first data units, calculating the NACK ratio within the reference duration based on the determined target first data units and/or target second data units comprises:
   counting a first number of the target first data units based on the determined target first data units; and
   calculating the NACK ratio based on the first number and a number of all first data units that are transmitted within the reference duration.

5. The method of claim 2, wherein when the HARQ feedback information received within the reference duration only comprises the HARQ feedback information for the first data units, calculating the NACK ratio within the reference duration based on the determined target first data units and/or target second data units comprises:
   determining a ratio of a number of target first data units in each second data unit to a number of first data units that are transmitted in the corresponding second data unit as a NACK ratio in the corresponding second data unit;
   calculating a sum of NACK ratios in all second data units;
   acquiring a second number of all second data units that are transmitted within the reference duration; and
   calculating the NACK ratio based on the sum of NACK ratios in all second data units and the second number.

6. The method of claim 2, wherein when the HARQ feedback information received within the reference duration only comprises the HARQ feedback information for the second data units, calculating the NACK ratio within the reference duration based on the determined target first data units and/or target second data units comprises:
   counting a third number of the target second data units based on the determined target second data units; and
   calculating the NACK ratio based on the third number and a number of all second data units that are transmitted within the reference duration.

7. The method of claim 2, wherein when the HARQ feedback information received within the reference duration comprises the HARQ feedback information for the first data units and the HARQ feedback information for the second data units, calculating the NACK ratio within the reference duration based on the determined target first data units and/or target second data units comprises:
with respect to the HARQ feedback information for the first data units, normalizing second data units including the first data units to acquire NACK ratios in the second data units;
with respect to the HARQ feedback information for the second data units, determining a NACK ratio in the second data unit to be 1 when the second data unit is the target second data unit, and determining a NACK ratio in the second data unit to be 0 when the second data unit is not the target second data unit; and
calculating the NACK ratio based on a sum of the NACK ratios in all second data units and a number of all second data units that are transmitted within the reference duration.

8. The method of claim 7, wherein normalizing the second data units including the first data units to acquire the NACK ratios in the second data units comprises:
when a ratio of a number of target first data units in the second data unit to a number of first data units in the second data unit reaches a preset ratio, determining the corresponding second data unit as the target second data unit, and a NACK ratio in the second data unit as 1; or
acquiring a NACK ratio in the second data unit based on a ratio of a number of target first data units in the second data unit to a number of first data units in the second data unit.

9. The method of claim 1, wherein when the data transmission terminal is a base station and the data reception terminal is a terminal, adjusting the CWS based on the NACK ratio comprises:
when the NACK ratio is greater than a preset threshold, increasing a value of the CWS.

10. The method of claim 9, further comprising:
when a number of times that the value of the CWS maintains a preset maximum value, reaches a preset number of times, setting the value of the CWS to a preset minimum value.

11. The method of claim 1, wherein when the data transmission terminal is a terminal and the data reception terminal is a base station, or when the data transmission terminal is a terminal and the data reception terminal is another terminal, adjusting the CWS based on the NACK ratio comprises:
when the NACK ratio is less than 1, setting a value of the CWS to a preset minimum value.

12. A data transmission device, comprising:
a processor; and
a memory configured to store instructions executable by the processor;
wherein the processor is configured to:
receive Hybrid Automatic Repeat reQuest (HARQ) feedback information for first data units and/or second data units from a data reception terminal within a reference duration, the HARQ feedback information comprising acknowledgement (ACK) information or non-acknowledgement (NACK) information, one second data unit comprising one or more first data units;
determine target first data units or target second data units, for which the HARQ feedback information is counted as the NACK information;
calculate a NACK ratio within the reference duration based on the determined target first data units and/or target second data units; and
adjust the CWS based on the NACK ratio.

13. The data transmission device of claim 12, wherein the processor is further configured to:
when receiving the NACK information for first data units that are not transmitted or second data units that are not transmitted, from the data reception terminal, ignore the NACK information, and determining the first data units that are not transmitted or the second data units that are not transmitted not as the target first data units or the target second data units;
wherein all or part of time-frequency resources allocated for the first data units that are not transmitted or the second data units that are not transmitted are pre-empted by other first data units that are transmitted or other second data units that are transmitted.

14. The data transmission device of claim 13, wherein when the HARQ feedback information received within the reference duration only comprises the HARQ feedback information for the first data units, the processor is further configured to:
count a first number of the target first data units based on the determined target first data units; and
calculate the NACK ratio based on the first number and a number of all first data units that are transmitted within the reference duration.

15. The data transmission device of claim 12, wherein the processor is further configured to:
when receiving the NACK information for first data units that are transmitted or second data units that are transmitted, from the data reception terminal, or when not receiving the HARQ feedback information for first data units that are transmitted or second data units that are transmitted, from the data reception terminal, determine the first data units that are transmitted or the second data units that are transmitted as the target first data units or the target second data units;
wherein the first data units that are transmitted or the second data units that are transmitted, represent first data units or second data units in which all contents are transmitted.

16. The data transmission device of claim 13, wherein when the HARQ feedback information received within the reference duration only comprises the HARQ feedback information for the first data units, the processor is further configured to:
determine a ratio of a number of target first data units in each second data unit to a number of first data units that are transmitted in the corresponding second data unit as a NACK ratio in the corresponding second data unit;
calculate a sum of NACK ratios in all second data units;
acquire a second number of all second data units that are transmitted within the reference duration; and
calculate the NACK ratio based on the sum of NACK ratios in all second data units and the second number.

17. The data transmission device of claim 13, wherein when the HARQ feedback information received within the reference duration only comprises the HARQ feedback information for the second data units, the processor is further configured to:
count a third number of the target second data units based on the determined target second data units; and calculate the NACK ratio based on the third number and a number of all second data units that are transmitted within the reference duration.

18. The data transmission device of claim 13, wherein when the HARQ feedback information received within the reference duration comprises the HARQ feedback information for the first data units and the HARQ feedback information for the second data units, the processor is further configured to:
   with respect to the HARQ feedback information for the first data units, normalize second data units including the first data units to acquire NACK ratios in the second data units;
   with respect to the HARQ feedback information for the second data units, determine a NACK ratio in the second data unit to be 1 when the second data unit is the target second data unit, and determine a NACK ratio in the second data unit to be 0 when the second data unit is not the target second data unit; and
   calculate the NACK ratio based on a sum of the NACK ratios in all second data units and a number of all second data units that are transmitted within the reference duration.

19. The data transmission device of claim 18, wherein in normalizing the second data units including the first data units to acquire the NACK ratios in the second data units, the processor is further configured to:
   when a ratio of a number of target first data units in the second data unit to a number of first data units in the second data unit reaches a preset ratio, determine the corresponding second data unit as the target second data unit, and a NACK ratio in the second data unit as 1; or
   acquire a NACK ratio in the second data unit based on a ratio of a number of target first data units in the second data unit to a number of first data units in the second data unit.

20. A non-transitory computer-readable storage medium having stored thereon instructions that, when executed by a processor of a data transmission device, cause the data transmission device to perform a method for adjusting, a contention window size (CWS), the method comprising:
   receiving Hybrid Automatic Repeat reQuest (HARQ) feedback information for first data units and/or second data units from a data reception terminal within a reference duration, the HARQ feedback information comprising acknowledgement (ACK) information or non-acknowledgement (NACK) information, one second data unit comprising one or more first data units;
   determining target first data units or target second data units, for which the HARQ feedback information is counted as the NACK information;
   calculating a NACK ratio within the reference duration based on the determined target first data units and/or target second data units; and
   adjusting the CWS based on the NACK ratio.

* * * * *